(12) United States Patent
Curran et al.

(10) Patent No.: US 11,261,530 B2
(45) Date of Patent: Mar. 1, 2022

(54) CATHODIC PROTECTION SYSTEM AND MINIATURIZED CONSTANT CURRENT RECTIFIER

(71) Applicant: PRORBAR, INC., West Palm Beach, FL (US)

(72) Inventors: Joseph J. Curran, Atascadero, CA (US); Jeffrey A. Rees, Merritt Island, FL (US); Bradley M. Burns, Titusville, FL (US); Christopher H. Fogarty, Merritt Island, FL (US)

(73) Assignee: PRORBAR, INC., West Palm Beach, FL (US)

( * ) Notice: Subject to any disclaimer, the term of this patent is extended or adjusted under 35 U.S.C. 154(b) by 0 days.

(21) Appl. No.: 16/297,982

(22) Filed: Mar. 11, 2019

(65) Prior Publication Data
US 2020/0291531 A1 Sep. 17, 2020

(51) Int. Cl.
*H02M 7/12* (2006.01)
*C23F 13/04* (2006.01)

(52) U.S. Cl.
CPC ............. *C23F 13/04* (2013.01); *H02M 7/12* (2013.01)

(58) Field of Classification Search
CPC .................................. C23F 13/04; H02M 7/12
USPC ............................................................ 307/95
See application file for complete search history.

(56) References Cited

U.S. PATENT DOCUMENTS

| | | | | |
|---|---|---|---|---|
| 4,255,241 A * | 3/1981 | Kroon | ................... | C23F 13/02 204/196.33 |
| 4,419,672 A * | 12/1983 | Hird | ...................... | B41J 3/28 178/18.05 |
| 4,632,777 A * | 12/1986 | Nicholson | ............... | H01B 1/24 252/511 |
| 4,692,066 A * | 9/1987 | Clear | ..................... | C23F 13/02 405/216 |
| 4,900,410 A * | 2/1990 | Bennett | ................... | C23F 13/16 204/284 |
| 4,908,157 A * | 3/1990 | Fontana | ................ | C04B 14/104 252/511 |
| 4,931,156 A * | 6/1990 | Dowd | ..................... | C23F 13/02 204/196.3 |
| 5,055,166 A * | 10/1991 | Schutt | ..................... | C23F 13/02 204/196.33 |
| 5,077,486 A * | 12/1991 | Marson | ............. | H02M 3/33592 205/728 |
| 5,183,694 A * | 2/1993 | Webb | ...................... | C23F 13/02 204/196.3 |
| 5,340,455 A * | 8/1994 | Kroon | ..................... | C23F 13/06 204/196.3 |
| 5,421,968 A * | 6/1995 | Bennett | ................... | C23F 13/02 204/196.36 |
| 5,423,961 A * | 6/1995 | Bennett | ................... | C23F 13/02 204/196.3 |
| 5,466,353 A * | 11/1995 | Westermann | .......... | C23F 13/04 204/196.02 |

(Continued)

*Primary Examiner* — Daniel Kessie
*Assistant Examiner* — Brian K Baxter
(74) *Attorney, Agent, or Firm* — Sandberg Phoenix and von Gontard

(57) ABSTRACT

A cathodic protection system providing substantially complete coverage to individual steel-in-concrete units in a multi-unit structure. The system includes a power supply, an electronic circuit board, a header cable, anode wire in each unit connected to the header cable, an adhesive fiber mat in each unit, and a conductive coating in each unit.

4 Claims, 3 Drawing Sheets

(56) References Cited

U.S. PATENT DOCUMENTS

| | | | | |
|---|---|---|---|---|
| 5,609,748 | A * | 3/1997 | Kotowski | C23F 13/02 205/734 |
| 6,238,545 | B1 * | 5/2001 | Allebach | C23F 13/16 156/429 |
| 6,383,364 | B1 * | 5/2002 | Austnes | C04B 41/4566 205/734 |
| 6,506,295 | B1 * | 1/2003 | Takahashi | C23F 13/04 204/196.02 |
| 10,602,578 | B1 * | 3/2020 | Neri | H05B 45/355 |
| 2004/0112737 | A1 * | 6/2004 | Benham | C23F 13/04 204/196.11 |
| 2004/0196636 | A1 * | 10/2004 | Kim | F21V 31/04 361/736 |
| 2007/0158184 | A1 * | 7/2007 | Benham | C23F 13/04 204/196.06 |
| 2011/0018464 | A1 * | 1/2011 | Lo | H05B 45/395 315/294 |
| 2015/0260384 | A1 * | 9/2015 | Purdy | H05B 45/37 362/221 |
| 2018/0187314 | A1 * | 7/2018 | Hashemi | C23F 13/10 |
| 2019/0119819 | A1 * | 4/2019 | Koch | C23F 13/20 |
| 2020/0109478 | A1 * | 4/2020 | Van Delden | C23F 13/02 |

* cited by examiner

CATHODIC PROTECTION SYSTEM AND MINIATURIZED CONSTANT CURRENT RECTIFIER

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The subject matter herein relates generally to cathodic protection systems and more particularly to cathodic protection systems for steel-in-concrete structures utilizing a constant current rectifier with a voltage limiter.

In order to protect steel-in-concrete structures (such as balconies on condominium units) from cracking, various cathodic protection systems have been utilized. In all such systems, an anode or a string of anodes is either laid on the concrete or embedded in it. The anodes are connected in a circuit containing a rectifier and the steel reinforcing bars. The current from the rectifier is sent through the circuit wiring to the anode at which point it passes through the concrete itself to the reinforcing bars and from there through a negative return cable to the rectifier.

One type of cathodic protection system is sometimes referred to as an overlay system. That system comprises disposing a plurality of flexibly interconnected anodes on the concrete deck or base to be protected and cementing them in place. That system basically consists of applying a conductive paint completely over the surface of the concrete layer containing the reinforcing bars. Thereafter, a series of small diameter platinum wires are attached to the concrete paint layer utilizing strips of self-adhesive fiberglass mesh tape. The mesh is then covered with a layer of conductive paint. The anode system is completed and covers the entire concrete surface excluding a small radius around metal; typically 2 inches in diameter and one inch from the edges. A cosmetic acrylic paint can then be put over the conductive paint. The anodes are connected to a rectifier controller through a header cable.

A need to provide constant, individualized current to each condominium balcony has proven to be necessary for a combination of reasons. The traditional method using the typical cathodic protection rectifier uses a designed amount of protective current supplied to all the combined unit areas. In a residential condominium consisting of many exclusive use units, the cathodic protection rectifier method may: oversupply protective current to some exclusive balcony units, undersupply protective current to other exclusive balcony units, or supply no protective current to a number of balcony units.

There is no way to decipher whether all the unit balconies are receiving the design current or any protective current at all. An oversupply of current results in the burning of the anode, causing separation of the anode from the concrete—resulting in little ongoing protection. An undersupply of current or no supply of current allows for the corrosion to continue. Given these issues, there exists a need for customizable current protection without destructive testing. The disclosed invention achieves this goal by having an adjustable rectifier installed into each condominium receptacle area, where the direct current supplied varies according to the specific need of each unique unit.

BRIEF SUMMARY OF THE INVENTION

Briefly stated, a cathodic protection system utilizing a miniaturized constant current rectifier is provided. In the preferred embodiment, the system includes a power supply, electronic board converter, header cable, anode wire, and conductive coating.

The miniaturized constant current rectifier preferably includes a power supply, an electronic circuit board to convert residential AC 120 V to Direct Current, and an electronic circuit board to adjust the output of Direct Current and to limit the voltage.

DESCRIPTION OF THE PROFFERED EMBODIMENT

Figure 1:
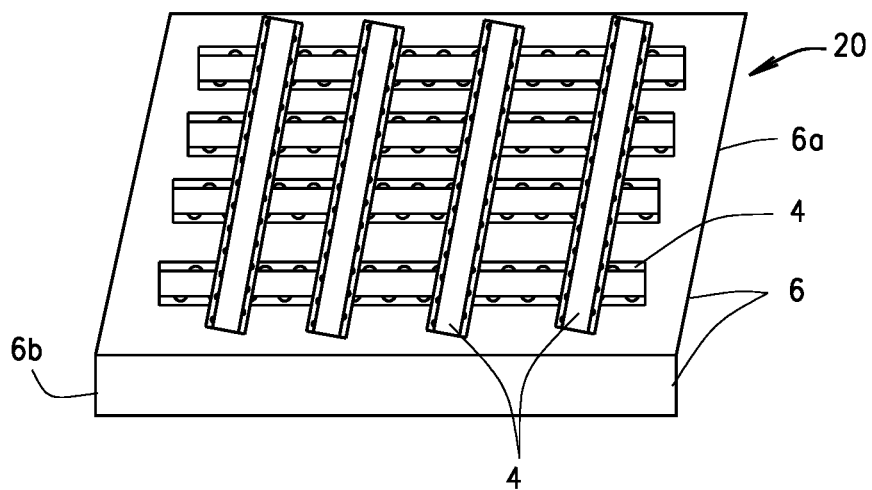
FIG. 1 is a plan view of the reinforcing steel mat in a concrete balcony slab.
Figure 2:
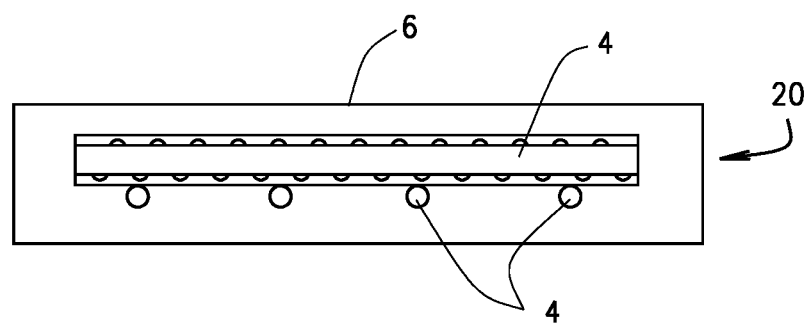
FIG. 2 is an elevation view of the reinforcing steel mat in a concrete balcony slab.

The following detailed description illustrates the claimed invention by way of example and not by way of limitation. The description clearly enables one skilled in the art to make and use the invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangement of components set forth in the following description or illustrated in the drawings. The claimed invention is capable of other embodiments and of being practiced or being carried out in various ways. Also, it is to be understood that the phraseology and terminology used herein is for the purpose of description As shown in FIGS. 1-6, the cathodic protection system 100 of the invention is designed specifically to provide customizable constant current to individualized balcony condominium units 10. The system utilizes a state of the art miniaturized constant current rectifier (See FIG. 7) to ensure complete coverage.

Figure 3:
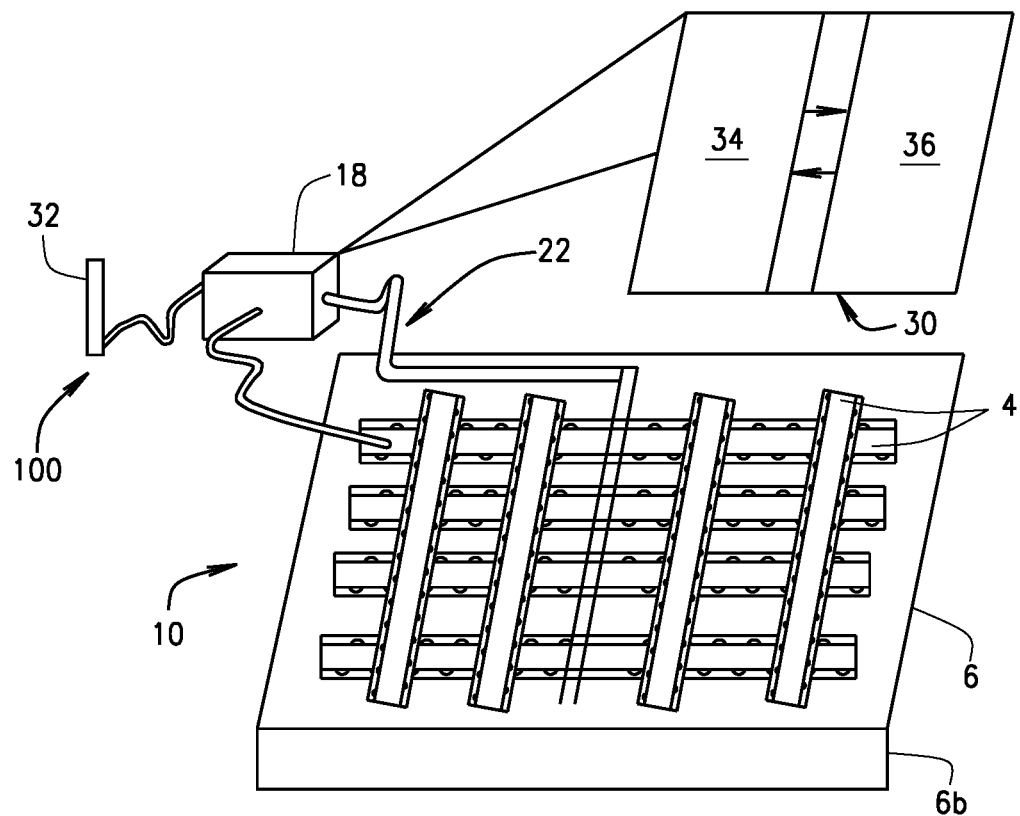
FIG. 3 shows the AC power, rectifier, header cable, and anode wire placement.
Figure 4:
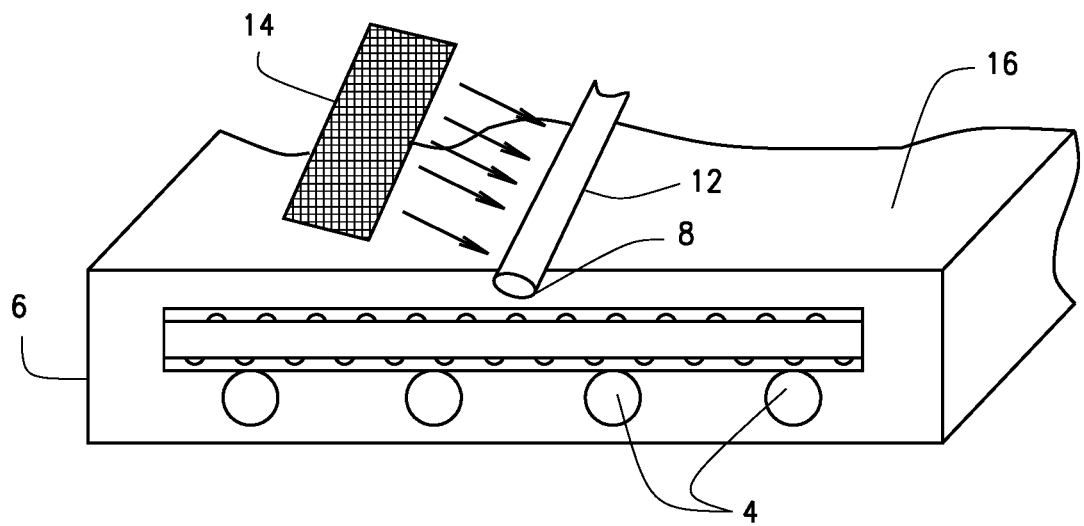
FIG. 4 shows placement of an adhesive fiber mat over an anode wire to hold it in place for painting of a concrete slab, anode wire, and tape.
Figure 5:
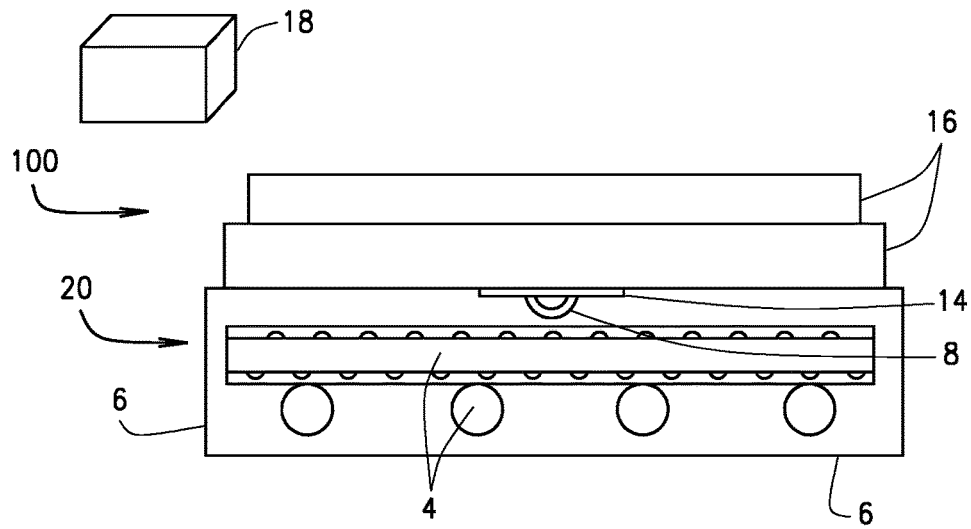
FIG. 5 shows the system portrayed without electrical wiring.
Figure 6:
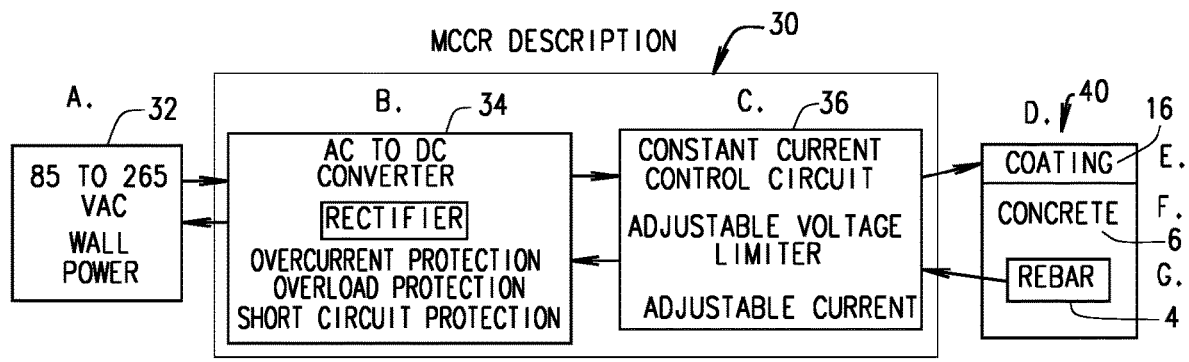
FIG. 6 is a flowchart of the entire cathodic system according to an embodiment.

Referring to an embodiment illustrated in FIGS. 3-5, the rebar 4 is placed at approximately ¾" below the surface of the concrete 6 in the reinforcing steel mat 20. Anode wire 8 is placed in a 1/16" groove 12 cut into the concrete 6 for aesthetic reasons or directly on top of the concrete surface. An adhesive fiber mat 14 is placed over the anode wire 8 holding the wire in place so that conductive paint 16 can be added.

The power supply 18 includes a header cable 22 which supplies Direct Current.

Figure 7:
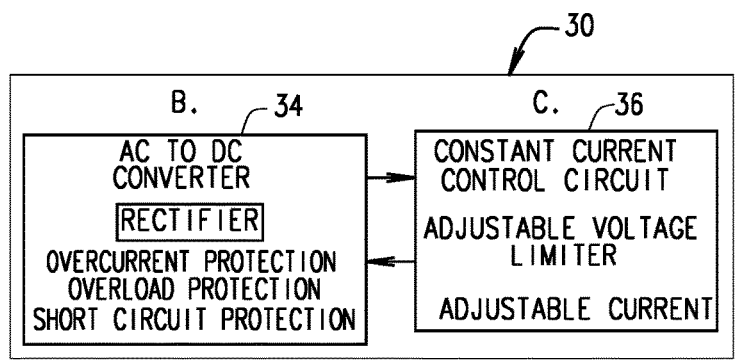
FIG. 7 is a flowchart of the miniaturized constant current rectifier according to an embodiment.

Referring to FIG. 7, in an embodiment depicted therein, the miniaturized constant current rectifier (MCCR) 30 operates from Component Block A 32, AC wall power (85 VAC to 265 VAC at 50 Hz or 60 Hz, European or American power). The Component Block B is an AC to DC converter 34 with sufficient power capability to deliver the appropriate power (voltage and current) to the Component Block C Constant Current Control Circuit 36.

Component Block B 34 typically uses (but is not limited to) common AC to DC conversion topologies such as switch-mode power supply (SMPS), AC Offline Switcher, Buck Converter, Fly Back, Fly Forward, continuous conduction, discontinuous conduction, step down transform and full or half bridge rectifier, AC to DC wall wart type. Component Block B is typically transformer isolated with a low voltage DC output for safety. Component Block B typically outputs insulated low voltage DC electrical power (such as 3.3V, 5V, 9V, 12V, 15V, 24V) for consumer safety, but it is not limited to low voltage DC electrical power.

Component Block C Constant Current Control Circuit 36 is responsible for accepting the input power (typically low voltage DC electrical power) and providing constant protective current to Component Block D Cathodic Protective Assembly. In cases where Component Block B is providing power other than low voltage DC, Component Block C has the capability to convert such power back into electrical current such as via an adjustable current potentiometer. From an electrical circuit perspective, Component Block D Cathodic Protective assembly 40 behaves as a variable electrical impedance/resistance based on the chemical reactions between the rebar, concrete and the coating. As the electrical impedance/resistance changes over time in Component Block D, the Constant Current Control Circuit will maintain the same current flowing. The voltage will adjust accordingly as the impedance/resistance of Block D changes. The voltage adjustment is used as a limiter to fail-safe to current flow. The adjustable voltage limiter is set at a value approximately 20-30% higher than the operating voltage. The operating voltage is determined by the required voltage to maintain the desired current.

The exact implementation of the Constant Current Control Circuit can be varied (e.g., DC to DC converter, Buck, Boost, Boost-Buck, CUK, Linear current regulation, Current Mirror, etc.) so long as the device supplies a constant (stable) current at a desired level even though the impedance of the cathodic protective assembly changes. Changes may happen due a number of factors, including changes in ambient temperature, salt intrusion, rain, dry season, wet season, wind direction, concrete chemistry change, etc. The Constant Current Control Circuit has the capability to manually adjust the current to account for various cathodic protective assemblies that are to be protected (e.g., in a concrete pad with rebar, the current requirements may be approximately in the range of 0.5 mA to 2 mA per square feet). As a protective feature, the constant current control circuit has an adjustable maximum voltage output. As the concrete cures, the impedance/resistance changes, usually decreasing with time; the rebar potential changes and usually less current flow is required for protection. Once the maximum (limiting) voltage is reached, the constant current control circuit automatically switches from constant current regulation to constant voltage regulation as an overprotection device.

As various changes could be made in the above constructions without departing from the scope of the invention, it is intended that all matter contained in the above description or shown in the accompanying drawing shall be interpreted as illustrative and not in a limiting sense.

What is claimed is:

1. A cathodic protection system for providing substantially complete, individual unit coverage to a multi-unit structure featuring steel-in-concrete units, the system comprising:
    an apparatus, the apparatus comprising:
    a power supply, the power supply comprising:
    an adjustable rectifier installed into a receptacle area for each individual unit of the mufti-unit structure featuring steel-in-concrete units, wherein the multi-unit structure featuring steel-in-concrete units comprises a steel-in-concrete multi-balcony, the adjustable rectifier comprising:
    a first electronic circuit board configured to convert residential AC to Direct Current; and
    a second electronic circuit board configured to adjust an output of the Direct Current, set a constant direct current output, and limit voltage;
    a header cable to carry the direct current;
    anode wire in each individual unit of the multi-unit structure featuring steel-in-concrete units connected to the header cable;
    an adhesive fiber mat in each individual unit of the multi-unit structure featuring steel-in-concrete units, and
    a conductive coating on each individual unit of the multi-unit structure featuring steel-in-concrete units; and
    wherein the second electronic circuit board provides constant current to the conductive coaling, adjusts the voltage, functioning to as limiter to fail-safe to current flow, setting at a value approximately 20-30% higher than the operating maintain a desired current;
    wherein the second electronic circuit board adjusts the current with current in the range of 0.5 mA to 2 mA per square feet, with an adjustable maximum voltage output for circuit protection; and
    wherein the second electronic circuit board automatically switches from constant current regulation to constant voltage regulation for additional protection.

2. An apparatus for providing constant current corrosion protection to a multi-unit structure featuring steel-in-concrete balcony units, comprising:
    a power supply, the power supply comprising;
    an adjustable rectifier installed into a receptacle area for each exclusive unit, the adjustable rectifier comprising;
    a first electronic circuit board configured to convert residential AC to Direct Current; and
    a second electronic circuit board configured to adjust an output of the Direct Current, set a constant direct current output, and limit voltage;
    a header cable to carry the direct current;
    anode wire in each individual unit of the multi-unit structure featuring steel-in-concrete units connected to the header cable,
    an adhesive fiber mat in each individual unit of the mufti-unit structure featuring steel-in-concrete units, and
    a conductive coating on each individual unit of the mufti-unit structure featuring steel-in-concrete units; and
    wherein the second electronic circuit board provides constant current to the conductive coating, adjusts the voltage, functioning to as limiter to tail-safe to current flow, setting at a value approximately 20-30% higher than the operating maintain a desired current;

wherein the second electronic circuit board adjusts the current with current in the range of 0.5 mA to 2 mA per square feet, with an adjustable maximum voltage output for circuit protection; and wherein the second electronic circuit board automatically switches from constant current regulation to constant voltage regulation for additional protection.

3. A method of providing substantially complete, customizable individual balcony unit corrosion protection coverage to a multi-unit structure featuring steel-in-concrete balcony units, the method comprising:

activating a cathodic protection system, the system comprising:

an apparatus, the apparatus comprising:

a power supply, the power supply comprising:

an adjustable rectifier installed into a receptacle area for each individual balcony unit, wherein the multi-unit structure featuring steel-in-concrete units comprises a steel-in-concrete multi-balcony, the adjustable rectifier comprising:

a first electronic circuit board configured to convert residential AC to Direct Current and a second electronic circuit board configured to adjust an output of the Direct Current, set a constant direct current output and limit voltage;

a header cable to carry the direct current;

anode wire connected to each individual balcony unit where desired and connected to the header cable;

an adhesive fiber mat connected to each individual balcony unit where desired; and a conductive coating applied to each individual balcony unit;

operating the cathodic protection system to provide customizable individual balcony unit corrosion protection by application of the apparatus, whereby residential AC is converted to Direct Current; and the output of the Direct Current is adjusted, a constant direct current output is set, the cathodic protection system voltage is limited, and the Direct Current supplied to each individual balcony unit is configured to be varied between individual balcony units;

wherein the second electronic circuit board provides constant current to the conductive coating, adjusts the voltage, functioning to as limiter to fail-safe to current flow, setting at a value approximately 20-30% higher than the operating voltage, wherein the operating voltage is determined by the required voltage to maintain a desired current;

wherein the second electronic circuit board adjusts the current with current in the range of 0.5 mA to 2 mA per square feet, with an adjustable maximum voltage output for circuit protection; and wherein the second electronic circuit board automatically switches from constant current regulation to constant voltage regulation for additional protection.

4. The method of claim 3 further comprising first installing the cathodic protection system of claim 3.

\* \* \* \* \*

UNITED STATES PATENT AND TRADEMARK OFFICE
CERTIFICATE OF CORRECTION

PATENT NO. : 11,261,530 B2  
APPLICATION NO. : 16/297982  
DATED : March 1, 2022  
INVENTOR(S) : Joseph J. Curran et al.

It is certified that error appears in the above-identified patent and that said Letters Patent is hereby corrected as shown below:

In the Claims

Claim 1 - Column 4, Line 12, replace "mufti-unit" with "multi-unit..."

Claim 2 - Column 4, Line 60, replace "mufti-unit" with "multi-unit..."

Claim 2 - Column 4, Line 63, replace "mufti-unit" with "multi-unit..."

Claim 2 - Column 4, Line 67, replace "tail-safe" with "fail-safe..."

Signed and Sealed this  
Sixth Day of September, 2022

Katherine Kelly Vidal  
*Director of the United States Patent and Trademark Office*